(12) United States Patent
Miyai et al.

(10) Patent No.: US 7,282,531 B2
(45) Date of Patent: Oct. 16, 2007

(54) ACRYLIC RESIN COMPOSITION DISPERSED IN WATER

(75) Inventors: Takashi Miyai, Takatsuki (JP); Naoki Kodama, Mino (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 11/091,568

(22) Filed: Mar. 29, 2005

(65) Prior Publication Data

US 2005/0221107 A1    Oct. 6, 2005

(30) Foreign Application Priority Data

Mar. 30, 2004  (JP) ............................. 2004-099924

(51) Int. Cl.
  *C08K 5/35* (2006.01)
  *C08K 3/10* (2006.01)
  *C01L 31/00* (2006.01)
  *C01L 33/00* (2006.01)
  *C09D 5/02* (2006.01)

(52) U.S. Cl. ................ 524/556; 524/96; 524/413

(58) Field of Classification Search ............ 524/556, 524/96, 413
See application file for complete search history.

(56) References Cited

U.S. PATENT DOCUMENTS

| | | | | |
|---|---|---|---|---|
| 4,880,867 A * | 11/1989 | Gobel et al. | ............... | 524/507 |
| 6,376,574 B1 * | 4/2002 | Helmer et al. | .............. | 523/172 |
| 6,566,426 B1 * | 5/2003 | Kanaida et al. | ............... | 524/96 |
| 6,713,551 B2 * | 3/2004 | Takahashi et al. | .......... | 524/500 |
| 2003/0207990 A1 | 11/2003 | Morihiro et al. | | |

FOREIGN PATENT DOCUMENTS

| | | |
|---|---|---|
| EP | 1 304 342 A1 | 4/2003 |
| JP | 2683063 | 4/1990 |
| JP | 05-170805 A | 7/1993 |
| JP | 3191978 | 11/1993 |
| JP | 06-049367 | 2/1994 |
| JP | 06-192341 A | 7/1994 |
| JP | 06-256715 A | 9/1994 |
| JP | 06-322007 A | 11/1994 |
| JP | 2000-007950 A | 1/2000 |
| JP | 2000-313863 A | 11/2000 |
| JP | 2003-155420 A | 5/2003 |
| WO | WO-03/091341 A1 | 11/2003 |

OTHER PUBLICATIONS

U.S. Appl. No. 10/512,157, Kodama et al.

* cited by examiner

*Primary Examiner*—Duane Smith
*Assistant Examiner*—Ives Wu
(74) *Attorney, Agent, or Firm*—Connolly Bove Lodge and Hutz

(57) ABSTRACT

It is an object to provide an acrylic resin composition dispersed in water. The composition has excellent appearance and sufficient dispersion stability, is stable even in one-package composition, exhibits physical properties of coating film excellent in water resistance, solvent resistance and weathering resistance, and sufficiently deals with recent environmental issues. It is also an object of the present invention to provide a coating film formed using such an acrylic resin composition dispersed in water. It is also an object of the present invention to provide a coating film formed using such an acrylic resin composition dispersed in water. The acrylic resin composition dispersed in water is an one-package composition obtained by combining a polymer comprising a monomer unit containing an aliphatic hydrocarbon group having 8 to 24 carbon atoms and a (meth) acrylic acid monomer unit, an oxazoline compound having two or more oxazoline rings and a specific amine compound.

4 Claims, No Drawings

ACRYLIC RESIN COMPOSITION DISPERSED IN WATER

FIELD OF THE INVENTION

The present invention relates to an acrylic resin composition dispersed in water and a coating film. More particularly, the present invention relates to an acrylic resin composition dispersed in water suitable for a variety of uses such as coating composition for finishing automobiles required to have excellent appearance and excellent coating physical properties, and a coating film using such an acrylic resin composition dispersed in water.

BACKGROUND ART

Since a resin composition dispersed in water may suppress the content of an organic solvent compared to that of a conventional resin dispersed in solvent, such a resin composition dispersed in water has been employed as an environment-friendly resin in a variety of uses such as water-based coating materials (coating compositions) for vehicles, plastic-molded products, domestic electric appliances, steel products, large scale constructions, aircrafts, building materials, construction materials, tiles, and craft products as well as adhesives, resist, printing ink. In a field of automotive coating compositions such as a clear top coating composition for finishing automobiles among such fields, the resin composition dispersed in water is required to give good appearance, sufficiently stable and excellent coating physical properties, and especially high water resistance and further along with increasing consciousness on environmental issues in recent years, in order to satisfy the requirement of low VOC (volatile organic compounds), a technique realizing sufficient reduction in the content of an organic solvent has been longed for.

With regard to a conventional resin dispersed in water, Japanese Kokai Publication Hei-6-192341 (pp 2-3) discloses a long-chain (meth)acrylate copolymer latex obtained in the following manner: a mixture of a long-chain alkyl (meth) acrylate and a hydrophilic monomer is emulsified and dispersed in an aqueous emulsifier solution to form monomer liquid droplets 5 µm or less and the monomer liquid droplets is polymerized. Japanese Kokai Publication 2000-313863 (pp 2-3) discloses an emulsion type adhesive composition obtained in the following manner: a monomer mixture containing a long-chain alkyl (meth) acrylate with an alkyl group having 9 to 13 carbon atoms and an $\alpha,\beta$-unsaturated monocarboxylic acid or dicarboxylic acid is emulsified and dispersed in an aqueous radically polymerizable emulsifier solution to form monomer liquid droplets having an average particle diameter of 2 µm or less, and the monomer liquid droplets is polymerized in the presence of an initiator. Japanese Kokai Publication Hei-5-170805 (p 2) discloses an aqueous resin emulsion obtained by emulsion polymerizing a (meth)acrylate of an alcohol having 8 to 30 carbon atoms and other copolymerizable vinyl monomers in an aqueous medium using two kinds of nonionic surfactants having a specific HLB. Japanese Kokai Publication Hei-6-322007 (pp 2-4) discloses an aqueous resin dispersion solution obtained by emulsion polymerizing a polymerizable monomer with an alkyl group having 12 to 18 carbon atoms and other polymerizable monomers in the presence of a high-molecular emulsifier. These resin compositions are obtained by using a highly hydrophobic long-chain alkyl(meth)acrylate as a monomer component and by dispersing the monomer component in an aqueous solvent using an emulsifier or the like to polymerize the monomer component and there is therefore a room for contrivance to more improve the appearance of coating film and the properties of coating film as a composition used in, particularly, applications such as paints for automobiles.

Also, Japanese Kokai Publication Hei-6-49367 (pp 2-3 and 5) discloses a resin composition dispersed in water obtained in the following manners: a resin mixture containing two kinds of acrylic resins having a carboxyl group and a hydroxyl group and a water-insoluble compound or resin having a functional group reactive with the above carboxyl group and hydroxyl group is neutralized by a base and then dispersed in water.

It is described that this resin composition comprises an acrylic resin (a) having a low acid value (acid value: 4 to 23) and an acrylic resin (b) having a high acid value, wherein the additive amount of the acrylic resin having a high acid value is as low as 5 to 25 parts by weight and the additive amount of the acrylic resin having a low acid value is 20 to 60 parts by weight. It is considered that the acid value is too low to use the carboxyl group for crosslinking, and satisfactory performance may not be exhibited because of insufficient crosslinking. Also, it is assumed that satisfactory performance may not be obtained because the dispersion stability of the composition after the composition is dispersed in water is insufficient, and an emulsifier is substantially added to improve, for example, dispersion stability and therefore the influence of the emulsifier on the coating film is concerned. In order that the resin composition sufficiently exhibits excellent coating properties such as excellent appearance and high water resistance required for, particularly, automotive coating compositions, reduction or nonuse of additives, such as emulsifiers, that may affect coating films is desired. There was therefore a room for contrivance in this point.

Moreover, in the specification (pp 1-3) of Japanese Patent No. 2683063, a plastic coating resin composition is disclosed, in which the plastic coating resin composition contains a polymer produced by copolymerizing monomer components including a polymerizable unsaturated monomer having a carboxyl group and other polymerizable unsaturated monomers, and addition polymerizable oxazoline and, as required, a polymer produced by (co)polymerizing monomer components including one or more types of other polymerizable unsaturated monomers. Japanese Kokai Publication 2003-155420 (pp 2, and 5-6) discloses a water-based resin composition comprising a combination of an anionic resin and/or an amphoteric resin, a polyvalent oxazoline compound and a polyvalent metal compound. It is described that these resin compositions use a long-chain acryl (meth) acrylate as a monomer component and an oxazoline crosslinking agent. An oxazoline ring may react with a carboxyl group and there was therefore a room for contrivance to more improve storage stability, thereby making a stable composition even in one-package composition, to more improve the dispersion stability of an acrylic resin in water, whereby the composition exhibits excellent appearance and coating properties when it is used in various applications such as coating compositions for automobiles.

In the meantime, Japanese Kokai Publication Hei-6-256715 (pp 2-4) discloses, a coating composition for repairing automobiles comprising a hydroxyl group-containing (meth) acryl copolymer, a polyisocyanate compound and a solvent and containing an organic solvent as a solvent type resin composition. Also, Japanese Kokai Publication 2000-7950 (page 2) discloses, a powder coating resin composition containing, as essential components, a vinyl copolymer comprising a vinyl monomer containing a silyl group, vinyl monomer containing a glycidyl group, a long-chain alkyl (meth) acrylate and a (meth) acrylate having a bulky alkyl group, and an aliphatic dibasic acid as a powder resin composition. In these resin compositions, there was a room for contrivance to exhibit excellent appearance and coating properties such as high water resistance which are required for, particularly, automobile coating compositions and to deal with recent environmental issues.

BRIEF SUMMARY OF THE PRESENT INVENTION

In view of the above state of the art, it is an object of the present invention to provide an acrylic resin composition dispersed in water. The composition has excellent appearance and sufficient dispersion stability, is stable even in one-package composition (one-liquid composition), exhibits physical properties of coating film excellent in water resistance, solvent resistance and weathering resistance, and sufficiently deals with recent environmental issues. It is also an object of the present invention to provide a coating film formed using such an acrylic resin composition dispersed in water.

The present inventors have made various studies on resin compositions dispersed in water and consequently, have found that when an acrylic polymer and a specific oxazoline compound are included in a resin composition dispersed in water, these compounds are thermally crosslinked to thereby obtain a resin composition having improved coating properties such as water resistance. The inventors have also found that use of a monomer having a long-chain aliphatic hydrocarbon group as a monomer component of an acrylic polymer improves appearance of coating film, and simultaneous use of a specific oxazoline compound more improves not only coating properties but also appearance of the coating film, because of synergic effect of use of a monomer having a long-chain aliphatic hydrocarbon group, to obtain a resin composition having excellent appearance and coating properties required for, particularly, automotive coating compositions. The inventors have also found that use of a nitrogen-containing compound having a specific structure improves water dispersion stability in an acrylic polymer, enables retention of stability in one-liquid and exhibits excellent appearance and physical properties of coating film when the composition is used in various applications, and the above-mentioned purpose could be attained, leading to completion of the present invention.

In water-based resin compositions, good appearance required for automotive applications and so on may not be obtained in resin having an emulsion form depending on molecular weight of the resin. However, in a preferred embodiment of the present invention, an acrylic polymer is obtained by solution polymerization, and the acrylic polymer is dispersed in water by removing solvent and substituting with water to obtain an acrylic resin composition dispersed in water. Therefore, a monomer such as a long-chain alkyl (meth) acrylate that is usually difficult incorporate into a water-based resin may be easily incorporated, leading to realization of appearance similar to that as in solvent-based resin though the resin is a water-based resin. Also, a resin dispersed in water may be obtained without using an additive such as an emulsifier (emulsifier free), therefore a resin dispersed in water having sufficiently excellent physical properties may be obtained.

That is, the present invention provides an acrylic resin composition dispersed in water, the composition being one-package composition obtained by combining a polymer comprising a monomer unit containing an aliphatic hydrocarbon group having 8 to 24 carbon atoms and a (meth) acrylic acid monomer unit, an oxazoline compound having two or more oxazoline rings and a compound represented by the following formula (1);

wherein $R^1$ and $R^2$, which may be the same or different, respectively represents a hydrogen atom or an alkyl group having one or more carbon atoms with or without a substituent and $R^3$ represents an alkyl group having one or more carbon atoms with or without a substituent.

The present invention also provides a coating film formed using the above-mentioned acrylic resin composition dispersed in water.

DETAILED DESCRIPTION OF THE INVENTION

Hereinafter, the present invention will be described in details.

The acrylic resin composition dispersed in water in the present invention comprises a combination of an acrylic polymer (acrylic resin), an oxazoline compound having two or more oxazoline rings and a compound represented by the above formula (1). The resin composition of the present invention is a one-package composition (one-pack composition) that may be sufficiently stable even in one-package composition.

In the present invention, the three structural elements may be respectively put in any state in the resin composition as long as the three structural elements are added to the resin composition. For example, each element is preferably put in a free state. As the compound (amine compound) represented by the above formula (1), a salt of an amine compound combined with an acrylic polymer and a free amine compound may coexist.

The acrylic resin composition dispersed in water of the present invention preferably has content of an organic solvent in the resin composition of 30% by weight (% by mass) or lower. More preferably, the resin composition practically contains no organic solvent. The significant reduction in content of a organic solvent enables to reduce the viscosity of the resin composition because of sufficient reduction in an amount of resin dissolved in the organic solvent, and to improve the solid content ratio, and simultaneously to suppress a generation of volatile organic compounds (VOC), resulting in sufficiently dealing with recent environmental problems. As described, the acrylic resin composition dispersed in water of the present invention sufficiently desired performances without additive of any organic solvent. However, depending on the purpose of use, an organic solvent in a proper amount may be added in order to further improvement in performances such as film formability and coating application suitability.

As the above-mentioned acrylic resin composition dispersed in water, any acrylic polymer may be satisfactory as long as the acrylic polymer is dispersed in water or a water/organic solvent mixed solvent in the presence of the compound represented by the above-mentioned formula (1)

and the oxazoline compound having two or more oxazoline rings. Among preferable examples as forms of the acrylic composition dispersed in water; (I) the resin composition containing an acrylic polymer dispersed in water (acrylic resin dispersed in water) obtained by dispersing an acrylic polymer in water in a presence of the above-mentioned compound represented by the formula (1), and the oxazoline compound, and (II) the resin composition containing an acrylic polymer dispersed in water obtained by dispersing acrylic polymer in a water/organic solvent mixed solvent in the presence of the above-mentioned compound represented by the formula (1), and the oxazoline compound.

In the acrylic polymer dispersed in water in the above-mentioned embodiments of (I) and (II) includes those obtained (a) by dispersing an acrylic polymer in water, which is obtained by a solution polymerization in an organic solvent, in the presence of the above-mentioned compound represented by the formula (1) and then removing the organic solvent; (b) by dispersing an acrylic polymer, which is obtained by a solution polymerization in an organic solvent, in a water/organic solvent mixed solvent in the presence of the above-mentioned compound represented by the formula (1); and (c) by dispersing an acrylic polymer, which is obtained by a solution polymerization in an organic solvent, in water in the presence of the above-mentioned compound represented by the formula (1), removing the organic solvent, and then further adding an organic solvent. Among them, the resin composition obtained by (a) is preferable.

In the above-mentioned water/organic solvent mixed solvent, weight (mass) ratio of water and the organic solvent is, but not especially limited, for example, preferably (30 to 100)/(0 to 70) and more preferably (50 to 100)/(0 to 50). Further preferably, as described above, a content of the organic solvent in the acrylic resin composition dispersed in water is set to be 30% by weight or less.

The acrylic polymer in the present invention is a polymer obtained by polymerizing a monomer component comprising a polymerizable monomer containing an aliphatic hydrocarbon group having 8 to 24 carbon atoms and a (meth) acrylic acid. In this case, the monomer unit of the aliphatic hydrocarbon group having 8 to 24 carbon atoms in the acrylic polymer is formed by the polymerizable monomer containing an aliphatic hydrocarbon group having 8 to 24 carbon atoms. The monomer unit may be that obtained by polymerizing an epoxy group-containing unsaturated monomer having an epoxy group at the terminal such as glycidyl (meth) acrylate as a monomer component, and then reacting a fatty acid containing a hydrocarbon group having 8 to 24 carbon atoms with the epoxy part to introduce a hydrocarbon group.

The acrylic polymer is more preferably a polymer obtained by polymerizing a monomer component containing a (meth) acrylate having a cycloalkyl structure as an essential component. Specifically, the acrylic polymer preferably essentially contains a (meth)acrylate monomer unit having a cycloalkyl structure. The acrylic polymer is more preferably a polymer obtained by polymerizing monomer components containing an alkyl (meth) acrylate having 8 to 24 carbon atoms, (meth) acrylic acid and a (meth)acrylate having a cycloalkyl structure as essential components and, as nessesary, other unsaturated monomers.

As the polymerizable monomer containing an aliphatic hydrocarbon group having 8 to 24 carbon atoms in the above monomer components, the polymerizable monomer having 12 to 24 carbon atoms are preferable. Also, as the polymerizable monomer, an alkyl(meth)acrylate containing an alkyl group having 8 to 24 carbon atoms is preferable.

As the above-mentioned alkyl(meth)acrylate having an alkyl group having 8 to 24 carbon atoms, for example, 2-ethylhexyl(meth)acrylate, lauryl(meth)acrylate, tridecyl (meth)acrylate, tetradecyl(meth)acrylate, pentadecyl(meth) acrylate, hexdecyl(meth)acrylate, heptadecyl(meth)acrylate, stearyl(meth)acrylate, behenyl(meth)acrylate, isomyristyl (meth)acrylate and isostearyl (meth) acrylate are preferable. One or more species of the acrylates may be used. Among the acrylates, alkyl (meth) acrylates having an alkyl group having 12 to 24 carbon atoms are preferable and for example, lauryl (meth) acrylate and stearyl(meth)acrylate are preferable.

As the content of the polymerizable monomer containing an aliphatic hydrocarbon group having 8 to 24 carbon atoms, the lower limit of the content is preferably 5% by weight when the total amount of all monomer components is defined as 100% by weight. When the content is less than 5% by weight, there is a fear that the appearance of coating film may not be sufficiently improved. The lower limit of the content is more preferably 10% by weight. The upper limit of the content is preferably 50% by weight. When the content exceeds 50% by weight, solvent resistance may not be sufficiently improved. The upper limit of the content is more preferably 40% by weight. Also, the content is preferably in a range from 5 to 50% by weight and more preferably in a range from 10 to 40% by weight.

As the above-mentioned epoxy group-containing unsaturated monomer, for example, glycidyl (meth)acrylate, α-methylglycidyl acrylate, glycidyl allyl ether, oxocyclohexylmethyl (meth)acrylate, 3,4-epoxycyclohexylmethyl acrylate (trade name: "CYCLOMERER A 200", manufactured by DAICEL CHEMICAL INDUSTRIES, LTD.), α-methylglycidyl methacrylate (trade name: "M-GMA", manufactured by DAICEL CHEMICAL INDUSTRIES, LTD.), and 3,4-epoxycyclohexylmethyl methacrylate (trade name: "CYCLOMERER M 100", manufactured by DAICEL CHEMICAL INDUSTRIES, LTD.) are preferable.

As the fatty acid containing a hydrocarbon group having 8 to 24 carbon atoms, for example, caprylic acid, caproic acid, lauric acid, myristic acid, palmitic acid, stearic acid, behenic acid, oleic acid, linoleic acid, linolenic acid, eleostearic acid, ricinoleic acid and erucic acid are preferable. Fatty acids having a hydrocarbon group having 12 to 24 carbon atoms are more preferable and examples of the acids include lauric acid, myristic acid, palmitic acid and stearic acid.

As the (meth) acrylate having a cycloalkyl structure, for example, cyclopropyl (meth) acrylate, cyclobutyl (meth) acrylate, cyclopentyl(meth)acrylate, cyclohexyl(meth)acrylate, cycloheptyl(meth)acrylate, cyclooctyl(meth)acrylate, cyclododecyl(meth)acrylate, isobornyl(meth)acrylate, 4-methylcyclohexylmethyl(meth)acrylate, tert-butylcyclohexyl(meth)acrylate, cyclohexylmethyl(meth)acrylate and dicyclopentanyl(meth)acrylate are preferable. These compounds may be used either singly or in combinations of two or more. Among the compounds, cyclohexyl(meth)acrylate and isobornyl(meth)acrylate are preferable.

As the content of the (meth) acrylate having a cycloalkyl structure, the lower limit of the content is preferably 5% by weight when the content of all monomers is defined as 100% by weight. When the content is less than 5% by weight, performances such as hardness, gloss, building characteristics and weathering resistance of coating film may not be sufficiently improved. The lower limit of the content is more preferably 8% by weight and still more preferably 12% by weight. The upper limit of the content is preferably 80% by weight. When the content exceeds 80% by weight, water resistance of coating film may not be sufficiently improved. The upper limit is more preferably 70% by weight and still more preferably 60% by weight. Also, the content is preferably in a range from 5 to 80% by weight, more preferably in a range from 8 to 70% by weight and still more preferably 12 to 60% by weight.

As the above-mentioned other unsaturated monomers, the following compounds are preferable and one or two or more of them are usable.

(Meth)acrylate monomers such as methyl (meth)acrylate, ethyl (meth)acrylate, n-butyl (meth)acrylate, isobutyl (meth)acrylate, tert-butyl (meth)acrylate, and benzyl (meth)acrylate; α,β-unsaturated carboxylic acid monomer such as crotonic acid, itaconic acid, maleic acid, and aleic anhydride; sulfonic acid group-containing polymerizable monomer such as vinylsulfonic acid, styrene sulfonic acid, and sulfoethyl (meth) acrylate.

Aromatic unsaturated monomers such as styrene and vinyltoluene; epoxy group-containing unsaturated monomers such as the above-mentioned compounds; nitrogen-containing unsaturated monomers such as N, N'-dimethylaminoethyl (meth)acrylate, (meth)acrylamide, N-phenylmaleimide, N-cyclohexylmaleimide, N-vinylpyridine, and N-vinylimidazole; unsaturated cyanides such as (meth) acrylonitrile; vinyl esters such as vinyl acetate and vinyl butyrate; fluorine atom-containing unsaturated monomers such as trifluoroethyl (meth)acrylate and tetrafluoropropyl (meth)acrylate; vinyl ethers such as vinyl methyl ether and vinyl ethyl ether; and polyfunctional unsaturated monomers such as ethylene glycol diacrylate, neopentyl glycol diacrylate, polypropylene glycol #400 diacrylate.

Hydroxyl group-containing monomers such as 2-hydroxyethyl (meth) acrylate, 2-hydroxypropyl (meth) acrylate, 3-hydroxypropyl (meth) acrylate, 2-hydroxybutyl (meth) acrylate, 4-hydroxybutyl acrylate (trade name: "4HBA", manufactured by MITSUBISHI CHEMICAL CORPORATION), 4-hydroxybutylmethacrylate, α-hydroxymethylethyl (meth)acrylate, caprolactone-modified hydroxy (meth)acrylate (trade name: "PLACCEL F series", manufactured by DAICEL CHEMICAL INDUSTRIES, LTD.), 4-methylolcyclohexyl methyl acrylate (trade name: "CHDMMA", manufactured by Nippon Kasei Chemical Co., Ltd.); polyethylene glycol mono(meth)acrylate, polypropylene glycol mono(meth)acrylate, polytetramethylene glycol mono(meth)acrylate, polyethylene glycol polytetramethylene glycol mono(meth)acrylate, and polypropylene glycol polytetramethylene glycol mono(meth)acrylate.

Benzotriazole type UV absorbing monomers such as 2-[2'-hydroxy-5'-(meth) acryloyloxyethylphenyl]-2H-benzotriazole, 2-[2'-hydroxy-5'-(meth)acryloyloxypropylphenyl]-2H-benzotriazole, 2-[2'-hydroxy-5'-(meth)acryloyloxyhexylphenyl]-2H-benzotriazole, 2-[2'-hydroxy-3'-tert-butyl-5'-(meth)acryloyloxyethylphenyl ]-2H-benzotriazole, 2-[2'-hydroxy-3'-tert-butyl-5'-(meth)acryloyloxyethylphenyl]-5-chloro-2H-benzotriazole, 2-[2'-hydroxy-5'-tert-butyl-3'-(meth)acryloyloxyethylphenyl]-2H-benzotriazole, 2-[2'-hydroxy-5'-tert-butyl-3'-(meth)acryloyloxyethylphenyl]-5-chloro-2H-benzotriazole, 2-[2'-hydroxy-5'-(meth) acryloyloxyethylphenyl]-5-methoxy-2H -benzotriazole, 2-[2'-hydroxy-5'-(meth)acryloyloxyethylphenyl]-5-cyano-2H-benzotriazole, 2-[2'-hydroxy-5'-(meth)acryloyloxyethylphenyl]-5-tert-butyl -2H-benzotriazole, 2-[2'-hydroxy-5'-(β-methacryloyloxyethoxy)-3'-tert-butylphenyl]-4-tert-butyl-2H-benzotriazole, and commercial RUVA-93 (manufactured by Otsuka Chemical Co., Ltd.).

Benzophenone type UV absorbing monomers such as 2-hydroxy-4-methacryloxybenzophenone, 2-hydroxy-4-(2-hydroxy-3-methacryloxy)propoxybenzophenone, 2-hydroxy-4-(2-methacryloxy)ethoxybenzophenone, and 2-hydroxy-4-vinyloxycarbonylmethoxybenzophenone; and UV stable unsaturated monomers such as 4-(meth) acryloyloxy-2,2,6,6-tetramethylpiperidine, 4-(meth) acryloyloxy-1,2,2,6,6-pentamethylpiperidine, 4-(meth)acryloylamino-2,2,6,6-tetramethylpiperidine, 4-(meth) acryloylamino-1,2,2,6,6-pentamethylpiperidine, 4-cyano-4-(meth) acryloyamino-2,2,6,6-tetramethylpiperidine, 4-crotonoyloxy-2,2,6,6-tetramethylpiperidine, 4-crotonoylamino-2,2,6,6-tetramethylpiperidine, 1-(meth) acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 1-crotonoyl-4-crotonoyloxy-2,2,6,6-tetramethylpiperidine, commercial ADK Stab LA-82 and LA-87 (manufactured by Asahi Denka Co., Ltd.), and commercial FA-711 MM and FA-712 HM (manufactured by Hitachi Chemical Co., Ltd.).

As the above-mentioned UV absorbing unsaturated monomer, benzotriazole type unsaturated monomers are preferable. The ratio of the UV stable unsaturated monomer or the UV absorbing unsaturated monomer to be used is, but not especially limited, preferably 0.1 to 50% by weight when total of the monomers is defined as 100% by weight. When the content is less than 0.1% by weight, weathering resistance of coating film may not be improved sufficiently and when it exceeds 50% by weight, appearance of coating film may be deteriorated.

A method for solution polymerization using the above-mentioned monomer components in an organic solvent is not especially limited, and hydrophilic organic solvents compatible with water are preferable as organic solvents to be used. For examples, alkyl alcohols such as methyl alcohol, ethyl alcohol, n-propyl alcohol, isopropyl alcohol, n-butyl alcohol, sec-butyl alcohol, tert-butyl alcohol, and isobutyl alcohol; ethylene glycols such as ethylene glycol, ethylene glycol monomethyl ether, ethylene glycol monobutyl ether, propylene glycol monoethyl ether, and diethyleneglycol; esters such as ethyl acetate; ether alcohols such as methylcellosolve, ethylcellosolve, propylcellosolve, butylcellosolve, methyl carbitol, and ethyl carbitol; ether esters such as methylcellosolve acetate, ethylcellosolve acetate, and propylene glycol monomethyl ether acetate; aromatic or aliphatic hydrocarbons such as benzene, toluene, xylene, cycohexane, and n-heptane; ketones such as acetone and methyl ethyl ketone are preferable and one or two or more of them can be used.

In the case the organic solvent is removed after the acrylic polymer is dispersed in water, the organic solvent having low boiling points is preferable to be used among the organic solvents, and for example, lower alcohol having 1 to 4 carbon atoms is preferable. Also, in the case an acrylic polymer is dispersed in a water/organic solvent mixed solvent, an organic solvent having high boiling points is preferable to be used, and for example, propylene glycol monoethyl ether and/or propylene glycol monoether acetate are preferable.

The organic solvents to be used for the water/organic solvent mixed solvent are same as those used in the above-mentioned solution polymerization.

The above-mentioned organic solvent may be used in combination with water and in such a case, in order to sufficiently improve the polymerizable property of the monomer components, the polymerization reaction is preferably carried out at the ratio of water 85% by weight or lower, more preferably 60% by weight or lower, and even more preferably 50% by weight or lower, to total solvent amount 100% by weight.

In the above-mentioned polymerization method as a polymerization initiator, it is preferable to use, persulfates such as ammonium persulfate, sodium persulfate, and potassium persulfate; hydrogen peroxide; azo compounds such as azobis-2methylpropionamidine chloride, 2,2'-azobisisobutyronitrile, 2,2'-azobis(2-methylbutyronitrile), and 2,2'-azobis-(2,4-dimethylvaleronitrile); and peroxides such as benzoyl peroxide, lauroyl peroxide, cumene hydroperoxide, and tert-butyl peroxy-2-ethylhexanoate. Also, as a promoter, reducing agents such as sodium hydrogen sulfite, sodium sulfite, Mohr's salt, sodium pyropersulfite, formaldehyde sodium sulfoxylate, and ascorbic acid; and amines such as ethylenediamine, ethylenediaminetetraacetate sodium salt, and glycine may be used in combination. Each of these polymerization initiators and promoters may be used independently or in combination of two or more thereof.

In the above-mentioned polymerization method, as necessary, a chain transfer agent may be used. Such a chain transfer agent is not especially limited, hydrophobic chain transfer agent may be used.

As the above-mentioned hydrophobic chain transfer agent, a thiol compound having hydrocarbon groups having 3 or more carbon atoms and a compound having 10% or lower solubility in water at 25° C. are preferable. The above-mentioned chain transfer, thiol chain transfer agent such as butanethiol, octanethiol, decanethiol, dodecanethiol, hexadecanethiol, octadecanethiol, cyclohexylmercaptan, thiophenol, octyl thioglycolate, octyl 2-mercaptopropionate, octyl 3-mercaptopropionate, mercaptopropionic acid 2-ethylhexyl ester, octanoic acid 2-meracptoethyl ester, 1,8-dimercapto-3,6-dioxaoctane, decanetrithiol, dodecylmercaptan; halides such as tetrachlorocarbon, tetrabromocarbon, methylene chloride, bromoform, and bromotrichloroethane; and unsaturated hydrocarbon compounds α-methylstyrene dimer, α-terpinene, γ-terpinene, dipentene, and tarpinolene may be used, and one or two or more of them can be used. Among them, thiol chain transfer agent comprising hydrocarbon groups having 3 or more carbon atoms is preferable.

A hydrophilic chain transfer agent may be used, as necessary, in combination with the above-mentioned hydrophobic chain transfer agent. As the above-mentioned hydrophilic chain transfer agents, thiol chain transfer agents such as mercaptoethanol, thioglycerol, thioglycolic acid, mercaptopropionic acid, 2-mercaptopropionic acid, 3-mercaptopropionic acid, thiomalic acid, and 2-mercaptoethanesulfonic acid; primary alcohols such as 2-aminopropan-1-ol; secondary alcohols such as isopropanol; and lower oxoacids and salts thereof such as phosphorous acid, hypophosphorous acid and salts thereof (sodium hypophosphite and potassium hypophosphite, etc.), sulfurous acid, hydrogen sulfite, dithionous acid, metabisulfurous acid and salts thereof (sodium sulfite, sodium hydrogen sulfite, sodium dithionite, sodium metadisulfite, potassium sulfite, potassium hydrogen sulfite, sodium dithionite, and potassium metadisulfite, etc.). One or two or more of them may be used.

As the addition methods of the above-mentioned chain transfer agent to a reaction container, the chain transfer agents may be added continuously, for example, dropwise or in dividing manner. Also, the chain transfer agents may be added independently to the reaction container or after being mixed previously with monomers, solvent and the like.

The above-mentioned polymerization method may be carried out in batch manner or continuous manner. In the polymerization methods, the addition method of the monomer components and polymerization initiator to a reaction container is not especially limited, and the polymerization are preferably carried out by loading a reaction container with the organic solvent and all of the monomer components and adding the polymerization initiator to the reaction container; by loading a reaction container with the organic solvent and some of the monomer components and adding the polymerization initiator and the remaining monomer components to the reaction container; by loading a reaction container with the organic solvent and adding the entire amounts of the monomers and the polymerization initiator. Among the methods, since distribution of molecular weight of acrylic resin obtainable may be narrow (sharp), polymerization is preferably carried out by a method in which polymerization initiator and the monomers are successively dropped into a reaction container.

In the above-mentioned polymerization method, polymerization conditions such as polymerization temperature or the like may be properly determined depending on the solvent, the polymerization initiator, and the chain transfer agent, and the polymerization temperature is preferably 0° C. or higher and 150° C. or lower in general. It is more preferably 40° C. or higher and even more preferably 50° C. or higher. It is also more preferably 120° C. or lower and even more preferably 100° C. or lower.

In the present invention, as methods of polymerizing the above-mentioned monomer components other than the solution polymerization method, methods by suspension polymerization and emulsion polymerization may be mentioned. However, in a suspension polymerization, a resin containing no organic solvent may be obtained, but the resin may have undesirable particle diameter distribution or molecular weight, resulting in unsatisfactory appearance, or in a resin obtained by emulsion polymerization, the weight-average molecular weight may not be sufficiently reduced, and it may become difficult to give better appearance from that point of view using an emulsifier. Accordingly, in the present invention, the solution polymerization method is most preferably used to sufficiently improve appearance, physical properties of coating film and stability in the resin obtainable.

In the production process of the above-mentioned acrylic polymer dispersed in water, the acrylic polymer obtained in the above-mentioned manner is to be dispersed in water or in water/organic solvent mixed solvent in the presence of the compound represented by the above-mentioned formula (1). Preferable embodiments of this step are, for example, (A) method, wherein the compound represented by the formula (1) is added to an organic solvent containing the acrylic polymer to neutralize the acrylic polymer, and water or a water/organic solvent mixed solvent is added to the neutralized product and then the neutralized product is dispersed; (B) method, wherein the neutralized product is added to water/organic solvent mixed solvent and dispersed; (C) method, wherein water/organic solvent mixed solvent containing the compound represented by the formula (1) is added to an organic solvent containing the acrylic polymer, and neutralization and dispersion are carried out; (D) method, wherein to an organic solvent containing the acrylic polymer is added to water/organic solvent mixed solvent containing the compound represented by the formula (1), and neutralization and dispersion are carried out. Among them, the method (A) is preferable.

The compound represented by the above-mentioned formula (1) in the present invention is preferably used to neutralize the acrylic polymer. In the formula (1), $R^1$ and $R^2$, which may be the same or different, respectively represents a hydrogen atom or an alkyl group having one or more carbon atoms. $R^3$ represents an alkyl group having one or more carbon atoms. As the alkyl group having one or more carbon atoms in $R^1$ to $R^3$, for example, a methyl group, ethyl group, propyl group and isopropyl group are preferable. And, the alkyl group having one or more carbon atoms may be alkyl groups having a substituent such as a hydroxyalkyl group.

As the compound represented by the formula (1), one or more of secondary amine compounds (secondary amines) such as dimethylamine, diethylamine, dipropylamine and diethanolamine, primary amine compounds (primary amines) such as isopropylamine and tertiary amine compounds (tertiary amines) such as triethylamine, triethanolamine, N-methyldiethanolamine and N, N-dimethylethanolamine are preferably used. Among these compounds, diethylamine and dipropylamine are preferable from the viewpoint of drying temperature and dispersion stability.

The compound represented by the formula (1) is preferably used in an amount enough to neutralize the acrylic polymer sufficiently and to keep resin dispersion stability sufficiently after removing a solvent. For example, the compound is preferably used in an amount in which the ratio of a carboxyl group to be neutralized is preferably 80 mol % or more, more preferably 90 mol % or more and still more preferably excessive, that is, 100 mol % or more.

The method of dispersion in water or water/organic solvent mixed solvent may be carried out by mechanical stirring using a rod or a hand mixer, etc. In the present invention, the acrylic polymer may be dispersed in water without using an emulsifier, but an emulsifier may be used for exhibition of further sufficient stability, for example, anionic surfactant (emulsifier), nonionic surfactants, cationic surfactants, amphoteric surfactants, polymer surfactants, polymerizable surfactants having one or two or more polymerizable carbon-carbon unsaturated bond in one molecule may be employed.

In the above-mentioned production process of the above-mentioned acrylic polymer dispersed in water, as described, when the acrylic polymer is dispersed in water and then the organic solvent is removed (removing the solvent), for example, the solvent removal may be carried out under reduced pressure.

As the weight average molecular weight of the above-mentioned acrylic polymer, the lower limit is preferably 1000. When the weight average molecular weight is less than 1000, sufficient water resistance may be not obtained. The lower limit is preferably 2000 and more preferably 5000. The upper limit of the weight average molecular weight is preferably 100000. When the weight average molecular weight exceeds 100000, excellent leveling characteristics may be not obtained. The upper limit of the weight average molecular weight of the acrylic polymer is more preferably 50000 and still more preferably 20000. The weight average molecular weight is preferably in a range from 1000 to 100000 and more preferably in a range from 5000 to 50000.

The weight average molecular weight means a molecular weight measured (on a polystyrene basis) by HLC-8020 type gel permeation chromatography (column: TSK gel G-5000HXL and TSK gel GMHXL-L are serially used, manufactured by TOSOH CORPORATION, hereinafter referred to as GPC).

As the acid value of the acrylic polymer, lower limit of the acid value is preferably 40 mg KOH/g. When the acid value is less than 40 mg KOH/g, properties such as water resistance and solvent resistance may be not sufficiently improved because of insufficient improvement in dispersion stability in water and insufficient crosslinked density. The acid value of the acrylic polymer is more preferably 50 mg KOH/g. The upper limit of the acid value is preferably 200 mg KOH/g. When the acid value exceeds 200 mg KOH/g, the viscosity of the water dispersion may increase and the solid content may not be increased, resulting in impractical acrylic polymer. The upper limit is preferably 160 mg KOH/g and more preferably 110 mg KOH/g. Also, the acid value is preferably in a range from 40 to 200 mg KOH/g, more preferably in a range from 40 to 160 mg KOH/g and still more preferably in a range from 50 to 110 mg KOH/g.

As the hydroxyl group value (hydroxyl value), lower limit of the hydroxyl value is preferably 10 mg KOH/g. When the hydroxyl value is less than 10 mg KOH/g, the degree of crosslinking in the formation of coating film may not be sufficient, resulting in unsatisfactory coating performance. The lower limit of the hydroxyl value is more preferably 40 mg KOH/g, still more preferably 50 mg KOH/g and particularly preferably 80 mg KOH/g. The upper limit of the hydroxyl value is preferably 200 mg KOH/g. When the hydroxyl value exceeds 200 mg KOH/g, sufficient working effect of the present invention may be not be exhibited. The upper limit of the hydroxyl value is more preferably 180 mg KOH/g, still more preferably 160 mg KOH/g and particularly preferably 140 mg KOH/g. In the present invention, the acid value and the hydroxyl value are on a solid basis.

As the glass transition point (Tg) of the above-mentioned acrylic polymer, lower limit of the glass transition point is preferably 5° C. When the glass transition point is less than 5° C., the resistance of coating film may be not improved sufficiently. The lower limit of the glass transition point is more preferably 10° C. The upper limit of the glass transition point is preferably 50° C. When the glass transition temperature exceeds 50° C., a coating film may be fragile. The upper limit of the glass transition point is more preferably 30° C. The glass transition point is preferably in a range from 5 to 50° C. and more preferably in a range from 10 to 30° C.

The glass transition temperature may be calculated by conversion of a temperature (K) calculated according to the following Fox equation to (° C.):

$$1/Tg = \Sigma(Wi/Tgi)$$

Wherein Wi denotes the weight (mass) distribution of monomer i: and Tgi denotes Tg of the polymer of monomer i.

As the oxazoline compound having two or more oxazoline rings in the present invention, any oxazoline compound may be used, as long as the compound those which have two or more oxazoline rings and can crosslinkingly react with a carboxyl group of the acrylic polymer. As the oxazoline compound, for example, 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane) sulfide, bis-(2-oxazolinylnorbornane) sulfide and oxazoline ring-containing polymer are preferable. These compounds may be used either singly or in combinations of two or more. Among these compounds, oxazoline ring-containing polymers are preferable.

The oxazoline ring-containing polymer is easily obtained by polymerizing a monomer component containing an addition polymerizable oxazoline as an essential component and, as necessary, a monomer which may be copolymerized with the addition polymerizable oxazoline.

Examples of the addition polymerizable oxazoline include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline and 2-isopropenyl-5-ethyl-2-oxazoline. These addition polymerizable oxazolines may be used either singly or in combinations of two or more. Among the above exemplified addition polymerizable oxazolines, 2-isopropenyl-2-oxazoline is easily available industrially and therefore more preferable.

The amount of the addition polymerizable oxazoline in the above oxazoline ring-containing polymer is, but not especially limited to, preferably 5% by weight or more, more preferably 5 to 90% by weight and still more preferably 10 to 80% by weight in the monomer component. When the amount of the addition polymerizable oxazoline is less than 5% by weight, undesirably various resistances such as durability, water resistance and solvent resistance of coating film obtained by curing may be deteriorated. Also, when the amount exceeds 90% by weight, undesirably various resistances such as water resistance and solvent resistance are adversely affected.

Preferable examples of monomers copolymerizable with the addition polymerizable oxazoline include (meth) acrylic acid ester such as methyl(meth)acrylate, ethyl(meth)acrylate, n-butyl(meth)acrylate, isobutyl(meth)acrylate, t-butyl (meth)acrylate, cyclohexyl(meth)acrylate, 2-ethylhexyl (meth)acrylate, methoxypolyethylene glycol (meth) acrylate, lauryl (meth)acrylate, stearyl (meth) acrylate, 2-hydroxyethyl(meth)acrylate, 2-hydroxypropyl(meth)acrylate, mono-esterified products of (meth)acrylic acid and polyethylene glycol, 2-aminoethyl(meth)acrylate and salt thereof, caprolactone modified products of (meth)acrylic acid, (meth)acrylic acid-2,2,6,6-tetramethylpiperidine and (meth) acrylic acid-1,2,2,6,6-pentamethylpiperidine; salts of (meth) acrylic acid such as sodium (meth)acrylate, potassium (meth)acrylate and ammonium (meth)acrylate; unsaturated nitriles such as acrylonitrile and methacrylonitrile; unsaturated amides such as (meth)acrylamide, N-methylol (meth) acrylamide and N-(2-hydroxyethyl) (meth) acrylamide; vinyl esters such as vinyl acetate and vinyl propionate; vinyl ethers such as methyl vinyl ether and ethyl vinyl ether; α-olefins such as ethylene and propylene; halogen-containing α,β-unsaturated aliphatic hydrocarbons such as vinyl chloride, vinylidene chloride and vinyl fluoride; α,β-unsaturated aromatic hydrocarbons such as styrene, α-methylstyrene and sodium styrenesulfonate. Single or two or more species of the compounds may be used.

The resin composition of the present invention is preferably a water-based composition because of environmental considerations. Therefore, a water-soluble, water-dilutive or water-dispersible oxazoline ring-containing polymer is preferably used, and more preferably a water-soluble oxazoline ring-containing polymer is used. Also, in order to obtain the water-soluble oxazoline ring-containing polymer, the proportion of the hydrophilic monomer in the monomer component used in polymerization is set to be 50% by weight or more, and preferably to be 60 to 90% by weight from the viewpoint of water-solubility and hardenability.

Preferable examples of the aforementioned hydrophilic monomer include 2-hydroxyethyl(meth)acrylate, methoxypolyethylene glycol (meth) acrylate, monoesterified products of (meth)acrylic acids and polyethylene glycols, 2-aminoethyl(meth)acrylate and salt thereof, sodium (meth) acrylate, ammonium (meth) acrylate, (meth) acrylonitrile, (meth) acrylamide, N-methylol (meth) acrylamide, N-(2-hydroxyethyl) (meth) acrylamide and sodium styrenesulfonate. Among these compounds, monomers having a polyethylene glycol chain exhibiting high solubility in water such as methoxypolyethylene glycol (meth)acrylate and mono-esterified products of (meth)acrylic acids and polyethylene glycols are preferable.

The methods of polymerizing the oxazoline ring-containing polymer are not especially limited, and known various polymerization methods may be adopted. Examples of the polymerization method include solution polymerization in an aqueous medium, emulsion polymerization, suspension polymerization or block polymerization. The reaction conditions are not especially limited, and may be set according to the composition of the monomer component. However, the reaction temperature is preferably approximately 20 to 150° C. and the reaction time is preferably approximately 1 to 24 hours. Also, the monomer component may be fed in a reactor in one lump or may be fed continuously or intermittently according to a method such as dripping. The above polymerization method is preferably carried out in an atmosphere of inert gas such as nitrogen gas.

Examples of the above-mentioned aqueous medium include water; and a mixed solvent of a solvent uniformly miscible with water and water. Examples of the above solvent include lower alcohols such as methyl alcohol, ethyl alcohol, n-propyl alcohol, isopropyl alcohol, n-butyl alcohol and t-butyl alcohol; glycols such as ethylene glycol, ethylene glycol monomethyl ether, ethylene glycol monobutyl ether and diethylene glycol; and ketones such as acetone and methyl ethyl ketone. These solvents may be used either singly or in combinations of two or more. Among the above-mentioned aqueous media, water is particularly preferable. The amount of the aqueous medium to be used is not especially limited.

In the above-mentioned polymerization reaction, an initiator including an azo compound such as 2,2'-azobisisobutyronitrile or 2,2'-azobis (2-amidinopropane) dihydrochloride; persulfate such as potassium persulfate; and peroxide such as benzoyl peroxide or di-t-butyl peroxide may be used as necessary. The amount of the initiator to be used used is not especially limited, and may be set according to the composition of the monomer component. Also, the initiator may be fed in a reactor in one lump together with the monomer component or may be fed continuously or intermittently according to a method such as dripping. Also, in the above-mentioned polymerization reaction, a surfactant and the like may be used as necessary.

In the present invention, the oxazoline ring-containing polymer may also be obtained by introducing an oxazoline ring by post-modification of a polymer. Specific examples of a method of introducing the oxazoline ring include a method in which a polymer having a nitrile group is reacted with a monoamino alcohol (Japanese Kokai Publication Hei-9-235320) and a method in which a monoethanolamine is reacted with an ester part of a polymethacrylate and the reaction product is further dehydration-cyclized to introduce an oxazoline ring (U.S. Pat. No. 5,705,573). The solid content (non-volatile content) of the oxazoline compound is, but not especially limited, preferably in a range from 1 to 70% by weight and more preferably in a range from 10 to 50% by weight.

The oxazoline equivalent of the above oxazoline compound is preferably in a range from 120 to 2200 g-solid/equiv. and more preferably in a range from 130 to 1100 g-solid/equiv.

As the amount of the oxazoline compound to be compounded, the lower limit of the amount is preferably 5 parts by weight and the upper limit of the amount is preferably 130 parts by weight to 100 parts by weight of the acrylic resin composition dispersed in water. The amount is more preferably 10 to 125 parts by weight. When the amount of the oxazoline compound to be compounded is less than 5 parts by weight, crosslinking density may be not improved sufficiently, and resulting in reduction of the solvent resistance of coating film. When the amount exceeds 130 parts by weight, the water resistance of coating film may be reduced.

The acrylic resin composition dispersed in water may use a crosslinking agent which can react with a carboxyl group in the acrylic polymer. Examples of the crosslinking agent include carbodiimide compounds; and polyvalent metal compounds such as zirconium compounds, zinc compounds, titanium compounds and aluminum compounds. The amount of the crosslinking agent to be used may be properly designed according to the type and application of crosslinking agent. Also, a crosslinking agent which can react with a hydroxyl group in the acrylic polymer may be used together. Examples of these crosslinking agent include melamine and block isocyanate compound. Single or two or more species of the compounds may be used.

The acrylic resin composition dispersed in water may contain pigments and additives as necessary. Examples of the additives include a leveling agent, a UV absorbing agent, a UV stabilizer, an antioxidant, a polymerization inhibitor, a filler, a coupling agent, an anti-rust agent, an anti-bacterial agent, a metal inactivation agent, a wetting agent, a deforming agent, a surfactant, a reinforcing agent, a plasticizer, a lubricant, an antifogging agent, an anticorrosive agent, a pigment dispersant, a fluidity adjustment agent, a peroxide decomposition agent, a die discoloration agent, a fluorescent brightener, an organic anti-flaming agent, an inorganic anti-flaming agent, a dripping prevention agent, a melt fluidity reforming agent, an antistatic agent, an anti-algae agent, an anti-molding agent, a flame retardant, a slipping agent, a metal chelating agent, an anti-blocking agent, a heat resistance stabilizer, a machining stabilizer, and a coloring agent. One or two or more of them can be used.

In the present invention, the acrylic resin composition dispersed in water is applied to a substrate and hardened to form a hardened coating film suitable for various applications. That is, the coating film formed using the above-mentioned acrylic resin composition dispersed in water is includes in the present invention.

Examples of the substrate include inorganic substrates such as glass, slate, concrete, mortar, ceramic, and stones; metal substrates such as metal sheets of aluminum, iron, zinc, tin, copper, titanium, stainless steel, a tin plate, a galvanized sheet, metals plated with zinc, copper and chromium, metals treated with chromic acid and phosphoric acid; plastic substrates such as polyethylene, poly(vinyl chloride), ABS (acrylonitrile-butadiene-styrene), FRP (fiber-reinforced plastics), poly(ethylene terephthalate), polycarbonate, poly(methyl methacrylate), polystyrene, polypropylene, polyesters, polyolefins, acrylic resin, epoxy resin, and nylon resin; synthetic leathers; wood materials such as Japanese cypress, Japanese cedar, pine, and laminated wood; and organic materials such as fiber and paper. The substrates may be coated with commonly used coating composition such as a primer, an underlayer coating, an intermediate coating, and a metallic base top coating before application of the acrylic resin composition dispersed in water.

A coating method for forming the coating film using the acrylic resin composition dispersed in water and a hardening method of the coating film may be set properly depending on the uses and methods employed for the coating method are preferably immersion coating, brush coating, rolling brush coating, spray coating, roll coating, spin coating, dip coating, bar coating, flow coating, electrostatic coating, and die coating.

The hardening method may be carried out by normal temperature hardening and heat hardening and the hardening conditions may be set properly depending on the uses. For example, 40° C. or more and 200° C. or lower is preferable and 50° C. or more and 180° C. or lower is more preferable.

The thickness of the coating film to be formed using the acrylic resin composition dispersed in water may be set properly depending on the uses. When the acrylic resin composition dispersed in water for an automotive coating composition such as a clear top coating composition for finishing an automobile, the thickness of the coating film is preferably 10 µm or thicker and 100 µm or thinner. More preferably, it is 20 µm or thicker and 80 µm or thinner. With respect to the hardness of the coating film, since the hardness to be required differs depending on the uses of the coating film, the addition amounts of the constituent components and the reaction conditions may be set properly so that the coating film has proper hardness for the uses.

The above-mentioned acrylic resin composition dispersed in water is advantageously useful for various coating compositions for vehicles, plastic-molded products, domestic electric appliances, steel products, large scale constructions, aircrafts, construction materials, building materials, tiles, and craft products as well as adhesives, resist, and printing ink and particularly preferably for coating composition such as for solid color, metallic base, and clear top for finishing automobiles. Particularly, the acrylic resin composition dispersed in water is advantageously useful as a resin composition for baking coating in these uses.

The acrylic resin composition dispersed in water in the present invention has the above-mentioned constitution. Consequently, the composition has excellent appearance and sufficient dispersion stability, is stable even in one-package composition, exhibits physical properties of coating film excellent in water resistance, solvent resistance and weathering resistance, and sufficiently deals with recent environmental issues.

BEST MODES FOR CARRYING OUT THE INVENTION

The following examples illustrate the present invention more specifically. They are, however, by no means limitative of the scope of the invention. In the examples, "part(s)." means "part(s) by weight (part(s) by mass)" and "%" represents "% by weight (% by mass)", unless otherwise specified. Also, the acid value (acid number) is calculated on a solid basis.

PRODUCTION EXAMPLE 1

Acrylic Resin a Dispersed in Water

Acrylic acid 28.0 parts, styrene 72.0 parts, lauryl methacrylate 148.0 parts, cyclohexyl methacrylate 72.0 parts, methyl methacrylate 80.0 parts, and 2,2'-azobis-(2-methylbutyronitrile) 8.0 parts were dropwise added to isopropyl alcohol 600.0 parts heated at 85° C. in 3 hours. After completion of the dropwise addition, the mixture was kept at 85° C. for 4 hours to obtain a resin solution (a-1) with solid content approximately 40% by weight. Diethylamine 29.0 parts was added to the obtained resin solution (a-1) and then deionized water 600 parts was gradually added to emulsify the resin solution. Isopropyl alcohol was removed from the emulsified resin solution (a-1) by azeotropic distillation to obtain an acrylic resin A dispersed in water A dispersed in water with solid content 40% by weight.

PRODUCTION EXAMPLE 2

Acrylic Resin B Dispersed in Water

Acrylic acid 33.6 parts, styrene 43.2 parts, lauryl methacrylate 88.8 parts, cyclohexyl methacrylate 43.2 parts, methyl methacrylate 31.2 parts, and 2,2'-azobis-(2-methylbutyronitrile) 9.6 parts were dropwise added to isopropyl alcohol 360.0 parts heated at 85° C. in 3 hours. After completion of the dropwise addition, the mixture was kept at 85° C. for 4 hours to obtain a resin solution (b-1) with solid content approximately 40% by weight. Diethylamine 34.0 parts was added to the obtained resin solution (b-1) and then deionized water 360 parts was gradually added to emulsify the resin solution. Isopropyl alcohol was removed from the emulsified resin solution (b-1) by azeotropic distillation to obtain an acrylic resin B dispersed in water with solid content 40% by weight.

PRODUCTION EXAMPLE 3

Acrylic Resin C Dispersed in Water

Acrylic acid 35.0 parts, styrene 100.0 parts, butyl acrylate 160.0 parts, cyclohexyl methacrylate 100.0 parts, methyl methacrylate 105.0 parts, and 2,2'-azobis-(2-methylbutyronitrile) 10.0 parts were dropwise added to isopropyl alcohol 750.0 parts heated at 85° C. in 3 hours. After completion of the dropwise addition, the mixture was kept at 85° C. for 4 hours to obtain a resin solution (c-1) with solid content approximately 40% by weight. Diethylamine 29.0 parts was added to the obtained resin solution (c-1) and then deionized water 750 parts was gradually added to emulsify the resin solution. Isopropyl alcohol was removed from the emulsified resin solution (c-1) by azeotropic distillation to obtain an acrylic resin C dispersed in water with solid content 40% by weight.

PRODUCTION EXAMPLE 4

Acrylic Resin D Dispersed in Water

Acrylic acid 28.0 parts, styrene 72.0 parts, lauryl acrylate 148.0 parts, cyclohexyl methacrylate 72.0 parts, methyl methacrylate 80.0 parts, and 2,2'-azobis-(2-methylbutyronitrile) 8.0 parts were dropwise added to isopropyl alcohol 600.0 parts heated at 85° C. in 3 hours. After completion of the dropwise addition, the mixture was kept at 85° C. for 4 hours to obtain a resin solution (d-1) with solid content approximately 40% by weight. Triethylamine 40.1 parts was added to the obtained resin solution (d-1) and then deionized water 600 parts was gradually added to emulsify the resin solution. Isopropyl alcohol was removed from the emulsified resin solution (d-1) by azeotropic distillation to obtain an acrylic resin D dispersed in water with solid content 40% by weight.

PRODUCTION EXAMPLE 5

Acrylic Resin E Dispersed in Water

Acrylic acid 28.0 parts, styrene 72.0 parts, lauryl acrylate 148.0 parts, cyclohexyl methacrylate 72.0 parts, methyl methacrylate 80.0 parts, and 2,2'-azobis-(2-methylbutyronitrile) 8.0 parts were dropwise added to isopropyl alcohol 600.0 parts heated at 85° C. in 3 hours. After completion of the dropwise addition, the mixture was kept at 85° C. for 4 hours to obtain a resin solution (e-1) with solid content approximately 40% by weight. Isopropylamine 23.4 parts was added to the obtained resin solution (e-1) and then deionized water 600 parts was gradually added to emulsify the resin solution. Isopropyl alcohol was removed from the emulsified resin solution (e-1) by azeotropic distillation to obtain an acrylic resin E dispersed in water with solid content 40% by weight.

PRODUCTION EXAMPLE 6

Acrylic Resin F Dispersed in Water

Acrylic acid 28.0 parts, styrene 72.0 parts, lauryl acrylate 148.0 parts, cyclohexyl methacrylate 72.0 parts, methyl methacrylate 80.0 parts, and 2,2'-azobis-(2-methylbutyronitrile) 8.0 parts were dropwise added to isopropyl alcohol 600.0 parts heated at 85° C. in 3 hours. After completion of the dropwise addition, the mixture was kept at 85° C. for 4 hours to obtain a resin solution (f-1) with solid content approximately 40% by weight. 25% aqueous ammonia 27.0 parts was added to the obtained resin solution (f-1) and then deionized water 600 parts was gradually added to emulsify the resin solution. Isopropyl alcohol was removed from the emulsified resin solution (f-1) by azeotropic distillation to obtain an acrylic resin F dispersed in water with solid content 40% by weight.

PRODUCTION EXAMPLE 7

Acrylic Resin G Dispersed in Water

Acrylic acid 70.0 parts, styrene 150.0 parts, lauryl acrylate 100.0 parts, butyl acrylate 270.0 parts, cyclohexyl methacrylate 200.0 parts, methyl methacrylate 210.0 parts, and 2,2'-azobis-(2-methylbutyronitrile) 20.0 parts were dropwise added to isopropyl alcohol 1500.0 parts heated at 85° C. in 3 hours. After completion of the dropwise addition, the mixture was kept at 85° C. for 4 hours to obtain a resin solution (g-1) with solid content approximately 40% by weight. Diethylamine 71.1 parts was added to the obtained resin solution (g-1) and then deionized water 1500 parts was gradually added to emulsify the resin solution. Isopropyl alcohol was removed from the emulsified resin solution (g-1) by azeotropic distillation to obtain an acrylic resin G dispersed in water with solid content 40% by weight.

PRODUCTION EXAMPLE 8

Acrylic Resin Solution A

Acrylic acid 28.0 parts, styrene 72.0 parts, lauryl acrylate 148.0 parts, cyclohexyl methacrylate 72.0 parts, methyl methacrylate 80.0 parts, and 2,2'-azobis-(2-methylbutyronitrile) 8.0 parts were dropwise added to isopropyl alcohol 600.0 parts heated at 85° C. in 3 hours. After completion of the dropwise addition, the mixture was kept at 85° C. for 4 hours to obtain an acrylic resin solution A with solid content approximately 40% by weight.

EXAMPLE 1

3.4 parts of an oxazoline compound A (trade name: "EPOCROS WS-700", manufactured by Nippon Shokubai Co., Ltd., solid content 25%, oxazoline equivalent: 220 g-solid/equiv.) was added to an acrylic resin A dispersed in water (solid content 40% by weight; acid value 55 mgKOH/g; Tg 14° C.; and weight average molecular weight 18000) to obtain an acrylic resin composition dispersed in water having a solid content (mass) of 36%. The obtained resin composition and the acrylic resin A dispersed in water were evaluated based on the following evaluation tests. The results are shown in Table 1.

(Dispersion Stability)

The acrylic resin A dispersed in water was produced, and the solution was kept standing at 25° C. for 24 hours, the condition of the solution after was visually observed.
○: Nothing is changed.
x: Precipitates are generated.

(Storage Stability)

The obtained resin composition was kept standing at 25° C. for one week, and the condition of the solution was visually observed.
○: Some changes such as a rise in viscosity are not observed.
x: Solidified.

(Appearance of Coating Film)

A commercially available urethane metallic paint for automotive repair was applied to a steel plate treated with zinc phosphate so that the dry film had 30 μm thickness and dried to obtain a coating film. And the acrylic resin composition dispersed in water was applied thereon so that the dry film had 40 μm thickness, and the coating film was dried at 140° C. for 30 minutes, to observe the appearance of the coating film visually.
○: Smooth
Δ: A defect or crawling is observed on the coating film.
x: Orange peel like or whitened (Water Resistance)

The test piece used in the evaluation of the appearance of the coating film was dipped in 40° C. warm water for 24 hours to observe a change in the appearance of the coating film visually.
○: Unchanged
x: Blistered or whitened (Solvent Resistance)

The test piece used in the evaluation of the appearance of the coating film was further cured at room temperature for 24 hours and then xylene was dripped on the coating film, which was then kept standing for 30 minutes, to observe a change in the appearance of the coating film visually.
○: Unchanged.
Δ: Somewhat swelled.
x: Eluted.

EXAMPLE 2

An acrylic resin composition dispersed in water with solid content 34% by weight was obtained in the same manner as that in Example 1, except that the acrylic resin B dispersed in water (solid content 40% by weight; acid value 110 mgKOH/g; Tg 14° C.; and weight average molecular weight 12000) and the components used in the Example 1 in addition amounts respectively shown in Table 1 were used. The obtained resin composition and the acrylic resin B dispersed in water were subjected to the evaluation tests in the same manner as Example 1. The results are shown in Table 1.

EXAMPLE 3

An acrylic resin composition dispersed in water with solid content 36% by weight was obtained in the same manner as that in Example 1, except that the acrylic resin D dispersed in water (solid content 40% by weight; acid value 55 mgKOH/g; Tg 14° C.; and weight average molecular weight 18000) and the components used in the Example 1 in addition amounts respectively shown in Table 1 were used. The obtained resin composition and the acrylic resin D dispersed in water were subjected to the evaluation tests in the same manner as Example 1. The results are shown in Table 1.

EXAMPLE 4

An acrylic resin composition dispersed in water with solid content 36% by weight was obtained in the same manner as that in Example 1, except that the acrylic resin E dispersed in water (solid content 40% by weight; acid value 55 mgKOH/g; Tg 14° C.; and weight average molecular weight 18000) and the components used in the Example 1 in addition amounts respectively shown in Table 1 were used. The obtained resin composition and the acrylic resin E dispersed in water were subjected to the evaluation tests in the same manner as Example 1. The results are shown in Table 1.

EXAMPLE 5

An acrylic resin composition dispersed in water with solid content 36% by weight was obtained in the same manner as that in Example 1, except that the acrylic resin G dispersed in water (solid content 40% by weight; acid value 55 mgKOH/g; Tg 20° C.; and weight average molecular weight 18000) and the components used in the Example 1 in addition amounts respectively shown in Table 1 were used. The obtained resin composition and the acrylic resin G dispersed in water were subjected to the evaluation tests in the same manner as Example 1, except that the dry temperature of evaluation test of coating film appearance was set to 120° C. The results are shown in Table 1.

COMPARATIVE EXAMPLE 1

An acrylic resin composition dispersed in water with solid content 36% by weight was obtained in the same manner as that in Example 1, except that the acrylic resin C dispersed in water (solid content 40% by weight; acid value 55 mgKOH/g; Tg 23° C.; and weight average molecular weight 18000) and the components used in the Example 1 in addition amounts respectively shown in Table 2 were used. The obtained resin composition and the acrylic resin C dispersed in water were subjected to the evaluation tests in the same manner as Example 1. The results are shown in Table 2.

COMPARATIVE EXAMPLE 2

An acrylic resin composition dispersed in water with solid content 36% by weight was obtained in the same manner as that in Example 1, except that the acrylic resin F dispersed in water (solid content 40% by weight; acid value 55 mgKOH/g; Tg 14° C.; and weight average molecular weight 18000) and the components used in the Example 1 in addition amounts respectively shown in Table 2 were used. The obtained resin composition and the acrylic resin F dispersed in water were subjected to the evaluation tests in the same manner as Example 1. The results are shown in Table 2.

COMPARATIVE EXAMPLE 3

The respective tests were carried out in the same manner as that in Example 1, except the components used in Example 1 in addition amounts respectively shown in Table 3 were used. The results are shown in Table 3.

COMPARATIVE EXAMPLE 4

2.1 parts of an oxazoline compound B (trade name: "EPOCROS WS-500", manufactured by Nippon Shokubai Co., Ltd., solid content: 40%, oxazoline equivalent: 220 g-solid/equiv.) was added to 10.0 parts of a solvent type acrylic resin A (solid content 40% by weight; acid value 55 mg KOH/g; Tg 14° C.; and weight average molecular weight 18000) to obtain a solvent type acrylic resin composition having solid content (weight) of 40% by weight. The obtained resin composition and the solvent type acrylic resin A were evaluated based on the following evaluation tests. The results are shown in Table 2.

TABLE 1

|  |  | Example 1 | Example 2 | Example 3 | Example 4 | Example 5 |
|---|---|---|---|---|---|---|
| Constitution (parts by weight) | Acrylic resin A dispersed in water | 10.0 | — | — | — | — |
|  | Acrylic resin B dispersed in water | — | 10.0 | — | — | — |
|  | Acrylic resin D dispersed in water | — | — | 10.0 | — | — |
|  | Acrylic resin E dispersed in water | — | — | — | 10.0 | — |
|  | Acrylic resin G dispersed in water | — | — | — | — | 10.0 |
|  | Oxazoline compound A | 3.4 | 6.8 | 3.4 | 3.4 | 3.4 |
|  | Oxazoline compound B | — | — | — | — | — |
| Amine compound |  | diethylamine | diethylamine | triethylamine | isopropylamine | diethylamine |
| Dispersion stability |  | ○ | ○ | ○ | ○ | ○ |
| Storage stability |  | ○ | ○ | ○ | ○ | ○ |
| Appearance of coating film |  | ○ | ○ | ○ | ○ | ○ |
| Water resistance |  | ○ | ○ | ○ | ○ | ○ |
| Solvent resistance |  | Δ | ○ | Δ | Δ | ○ |

TABLE 2

|  |  | Comparative Example 1 | Comparative Example 2 | Comparative Example 3 | Comparative Example 4 |
|---|---|---|---|---|---|
| Constitution (parts by weight) | Acrylic resin A dispersed in water | — | — | 10.0 | — |
|  | Acrylic resin C dispersed in water | 10.0 | — | — | — |
|  | Acrylic resin F dispersed in water | — | 10.0 | — | — |
|  | Acrylic resin solution A | — | — | — | 10.0 |
|  | Oxazoline compound A | 3.4 | — | — | — |
|  | Oxazoline compound B | — | — | — | 2.1 |
| Amine compound |  | diethylamine | ammonia | diethylamine | — |
| Dispersion stability |  | ○ | X | ○ | — |
| Storage stability |  | ○ | — | ○ | X |
| Appearance of coating film |  | X | — | Δ | X |
| Water resistance |  | ○ | — | X | — |
| Solvent resistance |  | ○ | — | X | — |

The present application claims priority under 35 U.S.C. § 119 to Japanese Patent Application No. 2004-099924 filed Mar. 30, 2004, entitled "ACRYLIC RESIN COMPOSITION DISPERSED IN WATER." The contents of that application are incorporated herein by reference in their entirely.

What is claimed is:

1. An acrylic resin composition dispersed in water, the composition being one-package composition obtained by combining an oxazoline compound having two or more oxazoline rings, a compound represented by the following formula (1);

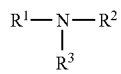 (1)

wherein $R^1$ and $R^2$, which may be the same or different, respectively represents a hydrogen atom or an alkyl group having one or more carbon atoms with or without a substituent and $R^3$ represents an alkyl group having one or more carbon atoms with or without a substituent, and a polymer comprising a first monomer unit containing an aliphatic hydrocarbon group having 8 to 24 carbon atoms and a (meth) acrylic acid monomer unit, wherein the content of the first monomer unit containing an aliphatic hydrocarbon group having 8 to 24 carbon atoms is 5% by weight to 50% by weight when the total amount of all monomer unit is defined as 100% by weight, and wherein the weight average molecular weight of the resin comprising a monomer unit containing an aliphatic hydrocarbon group having 8 to 24 carbon atoms and a (meth) acrylic acid monomer unit is 1000 to 100000.

2. A coating film formed using the acrylic resin composition dispersed in water according to claim 1.

3. The acrylic resin composition dispersed in water according to claim 1, wherein the resin comprising a monomer unit containing an aliphatic hydrocarbon group having 8 to 24 carbon atoms and a (meth) acrylic acid monomer unit comprises the monomer unit further containing a (meth) acrylate monomer unit having a cycloalkyl structure.

4. The acrylic resin composition dispersed in water according to claim 3, wherein the content of the monomer unit further containing a (meth) acrylate monomer unit having a cycloalkyl structure is 5 to 80% by weight when the content of all monomer units is defined as 100% by weight.

* * * * *